Aug. 15, 1950　　　　J. M. SIMPSON　　　　2,519,080
TANK TRANSMISSION
Filed Dec. 9, 1942　　　　　　　　　　　　2 Sheets-Sheet 2
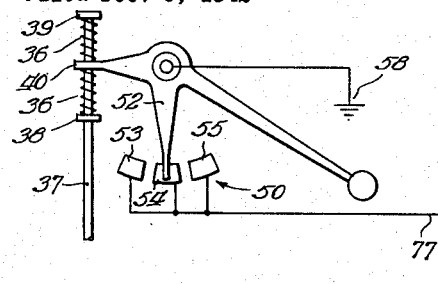
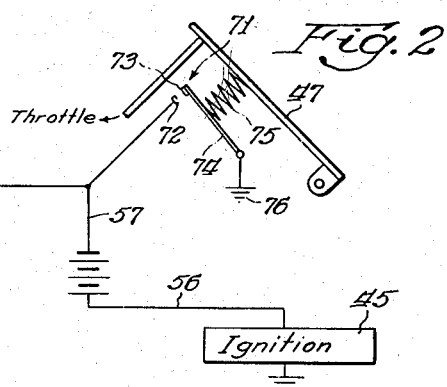
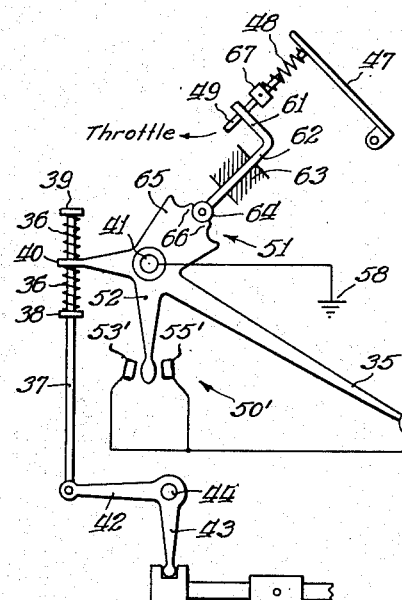
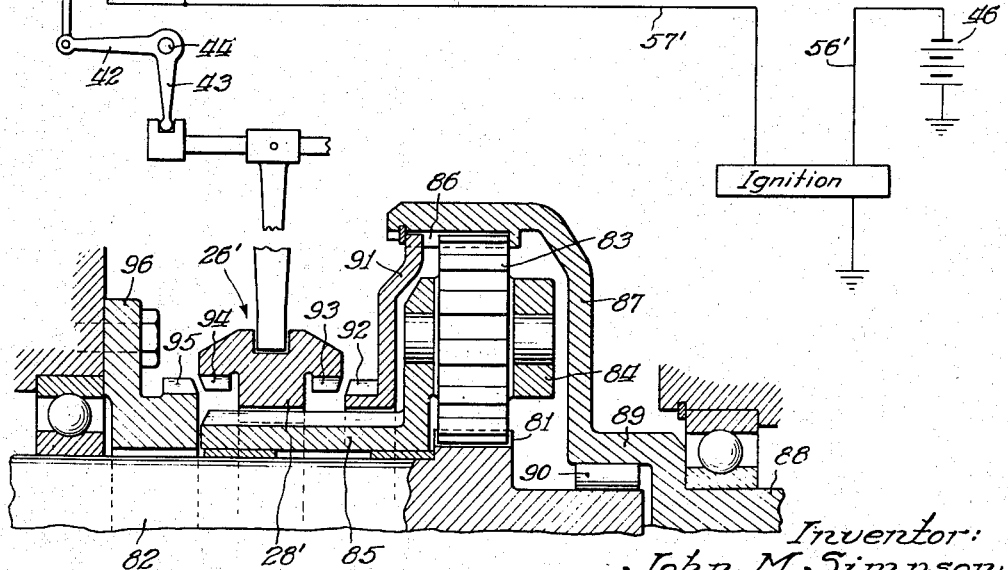
Inventor:
John M. Simpson
By: Edward C. Fritzlaugh
Atty.

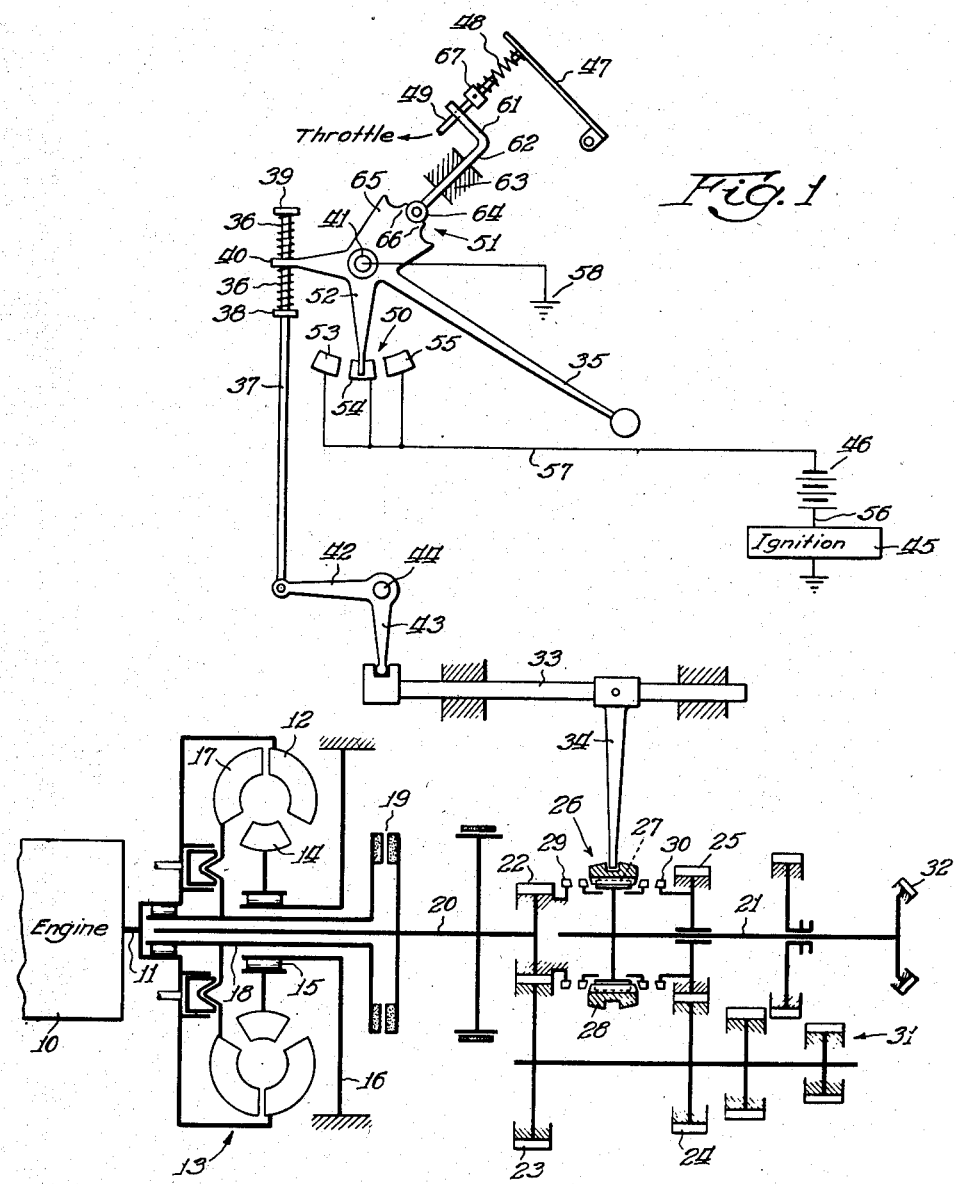

Patented Aug. 15, 1950

2,519,080

UNITED STATES PATENT OFFICE 2,519,080

TANK TRANSMISSION

John M. Simpson, Muncie, Ind., assignor to Borg-Warner Corporation, Chicago, Ill., a corporation of Illinois Application December 9, 1942, Serial No. 468,377

14 Claims. (Cl. 192—.08)

This invention relates to transmissions wherein power is transmitted from a power source to a load shaft through the medium of drive control elements which are positively interengageable and therefore readily engageable and disengageable only when not subject to torque load.

The object of the invention is, in general, to provide novel and improved mechanism for removing torque loads from such interengageable drive control elements when they are being shifted from engaged to disengaged relation and vice versa. The invention deals particularly with the problem of facilitating the disengagement of a jaw clutch employed in establishing a drive from an internal combustion engine to a load shaft in a heavy duty transmission such as, for example, a transmission adapted for use in a military tank.

The invention embodies as its basic concept the provision of an arrangement wherein the ignition of the driving engine is interrupted, in conjunction with the shifting of the drive control elements, at a time when the drive control elements are under a coast load, and the ignition is then restored, causing a rapid fluctuation in power output of the engine, which I have found to be very effective in facilitating the disengagement of the drive control elements. It has previously been the practice in transmissions of the overdrive type to interrupt the ignition while the drive control elements were under forward driving torque, the conventional means for doing this being a switch operated by a depression of the accelerator pedal beyond its maximum open position. In such an arrangement it was possible under abnormal conditions, such as by a very rapid depression of the accelerator pedal following immediately upon a period of coasting operation, to interrupt the ignition while the drive control elements were under coast load, but such condition was considered as an undesirable one requiring the provision of additional mechanism for correcting the same. The present invention, on the other hand, contemplates an arrangement wherein the interruption of the ignition while the drive control elements are under coast load is the normal mode of operation of the mechanism. To this end, the invention contemplates the elimination of any means for interrupting the ignition by depression of the accelerator pedal, and employs, instead, means which, in its normal operation, functions to interrupt the ignition when the engine throttle is closed so as to establish a coast load on the drive control elements. In its more specific aspects, the invention aims to provide means for facilitating the disengagement of a jaw clutch in a heavy duty type transmission, such as a tank transmission, while the clutch is under the drive of a torque converter or fluid coupling forming part of the means for transmitting the torque from the engine to the clutch. Even at idling speeds, a torque converter or fluid coupling will transmit sufficient torque to produce considerable difficulty in the shifting of the jaw clutches of a transmission driven therefrom, and the ordinary arrangement embodying a torque converter does not provide for completely disconnecting the engine from the transmission at idling speeds. I have discovered that it is possible to very effectively facilitate the shifting of the jaw clutches while under a constant torque with the throttle closed, by momentarily interrupting and then restoring the ignition, leaving the throttle closed, and the invention contemplates an arrangement wherein such a continuing torque load, either in the form of a coast load or a drag from a torque converter, may be momentarily removed while the throttle remains in a closed position.

Other objects, the advantages and uses of the invention will become more apparent after reading the following specification and claims, and after consideration of the drawings forming a part of the specification, wherein:

Fig. 1 is a schematic representation of a transmission embodying one form of the invention;

Fig. 2 is a schematic representation of a modified form of the control mechanism; and Fig. 3 is a view shown partially in axial section and partially in schematic diagram, of a further modification of the invention.

As an example of one form in which the invention may be embodied, I have shown in Fig. 1 a schematic representation of a heavy duty transmission suitable for use in tanks, wherein rotative power is transmitted from an internal combustion engine 10 through a shaft 11 to the impeller 12 of a torque converter indicated generally at 13. The stator 14 of the torque converter 13 is adapted to be connected through a suitable one-way clutch 15 to a frame member 16 of the transmission housing. The drive is transmitted from the impeller 12 to the rotor 17 and then through a tubular shaft 18 and a friction clutch 19 to an intermediate shaft 20. From the intermediate shaft 20 the drive is transmitted to the driven shaft 21 either through conventional countershaft type underdrive gearing or directly from the shaft 20 to the driven shaft 21, these two drives being selected by shifting a jaw clutch 26 to either of two driving positions. The underdrive gearing includes a gear 22 on the intermediate shaft 20, a countershaft gear 23 meshing with the gear 22, a countershaft gear 24, a gear 25 rotatable on the driven shaft 21 and meshing with the countershaft gear 24, and the jaw clutch 26.

The jaw clutch 26 is preferably of a synchronizing type such as that shown, for example, in the patent of S. O. White, No. 2,221,893, issued November 19, 1940, including a hub 27 mounted on the driven shaft 21, a slidable clutch sleeve 28 encircling and splined to the periphery of the hub 27, and jaw clutch elements 29 and 30 carried by the gears 22 and 25 respectively and adapted to be selectively clutched with the teeth of the jaw clutch sleeve 28. A reversing mechanism is indicated generally at 31. The driven shaft 21 may be provided with a bevel gear 32 for transmitting the drive to an axle member or differential gearing.

Suitable means for shifting the jaw clutch sleeve 28 is provided, such as the conventional shift rail 33 carrying a fork 34 engageable in a groove in the sleeve 28. The shift rail 33 in turn is shifted by suitable linkage connected to an operating member such as the lever 35. The invention contemplates the employment in this linkage of a suitable resilient connection permitting the lever 35 to be moved completely from one position to another while the clutch sleeve remains unshifted, although biased by the resilient connection. Such resilient connection may be in the form of a pair of compression springs 36 mounted on a rod 37 between abutments 38 and 39 thereon and a lever 40 through which the rod 37 extends, the lever 40 being connected to the lever 35 for movement therewith around the pivot 41 thereof. The rod 37 is connected to the shift rail 33 by any suitable means such as, for example, levers 42 and 43 moving together around a common pivot 44. It is to be understood that the above described linkage connecting the operating member 35 to the clutch 26 may be of any conventional or other suitable construction, the showing herein being schematic and purely illustrative.

The ignition of the engine 10 is shown schematically at 45, a source of electrical energy therefor being shown at 46. The engine 10 is controlled by a throttle, indicated by the word "throttle" on the drawing, the throttle in turn being controlled by a suitable actuator such as the accelerator pedal 47, arranged to transmit its movement to the throttle through a compression spring 48 and a rod 49.

In order to facilitate the shifting movement of the sleeve 28, I provide means for interrupting the ignition when the throttle is in closed position so as to impose a coast load on the clutch 26 and when the actuator lever 35 is moved from a position corresponding to an engaged position of the clutch sleeve 28 to a position corresponding to the neutral position of the clutch sleeve, and vice versa. Such mechanism includes a switch operated directly by the actuator 35, such switch being indicated generally at 50, and an interlock between the actuator 35 and the throttle, such interlock being indicated generally at 51. The switch 50 is shown schematically as comprising simply a lever 52 moving with the actuator 35 and a series of spaced contacts 53, 54 and 55 adapted to be contacted by the lever 52. Where it is desired to employ an open circuit type of ignition interruption, the switch 50 forms part of the circuit including the energy source 46, and suitable conductors 56 and 57, for supplying current to the ignition 45. In this case, the switch contacts 53, 54 and 55 are connected together in parallel as shown, and, as thus connected in parallel, are interposed in the ignition circuit in series with the energy source 46 and a suitable ground connection 58, which may be made through the lever 52.

The ignition is interrupted when the lever 52 moves to a position between two of the contacts 53, 54 and 55 without being in contact with either. Such an intermediate position of the lever 52 will be obtained in the transition of the actuator 35 from a position corresponding to either of the engaged positions of the clutch 26 (which two positions correspond to the positions of engagement of the switch lever 52 with the contacts 53 and 55 respectively) to the position of the actuator 35 corresponding to the neutral position of the clutch 26 (which neutral position corresponds to the position of engagement of the switch lever 52 with the intermediate contact 54). The ignition will be restored upon completion of the movement of the actuator to the neutral position. In a similar manner, the ignition will be interrupted during movement of the actuator from the neutral position to either of the engaged positions and will be restored upon completion of such movement.

The interlock mechanism 51 functions to insure the positioning of the throttle in closed position so as to establish a coast load on the clutch 26 at the time the ignition is interrupted. I have shown, as one example of mechanism that may be employed for this purpose, an interlock comprising a shiftable abutment member 61 through which the throttle rod 49 extends, forming part of a rod 62 slidably mounted in a bearing 63 and carrying a roller 64 which engages a cam sector 65 moving with the actuator lever 35. The cam sector 65 has two humps 66 adapted, when the switch lever 52 is in a position to interrupt the ignition, to engage the roller 64 and move the abutment 61 to a position where it coacts with the stop 67 on the throttle rod 49 to prevent the throttle from being opened or to forcibly move it to closed position in the event that it is open at the time. In the latter event (which would result from the accelerator pedal 47 being partially depressed) the rod 49 will be moved upwardly against the compression of the spring 48, which normally transmits movement of the accelerator pedal to the throttle rod 49. Thus the invention provides for moving the throttle to closed position, if it is not already closed, whenever the actuator lever 35 is moving to the ignition interrupting position, and consequently the ignition can be interrupted only when the throttle is closed.

In the modified form of the invention shown in Fig. 2, instead of the means for forcibly moving the throttle to closed position during ignition interruption, I provide an arrangement in which the throttle operating mechanism controls a switch that cooperates with a shift lever operated switch for interrupting the ignition. In this arrangement, the throttle operated switch 71 is in parallel with the three contacts, 53, 54 and 55 of the switch 50 so that the ignition is interrupted only when the switch arm 52 is out of contact with the three contacts 53, 54 and 55 and the throttle operated switch 71 is open, the latter condition being effected by moving the accelerator pedal 47 to throttle closing position. The switch 71 may comprise a pair of contacts 72 and 73, the latter carried by a spring arm 74 tending normally to open the contact and adapted to be urged toward closed position by a suitable yielding connection with the accelerator pedal 47 such as the coil spring 75, which closes the switch 72, 73 at an early stage of accelerator depression and permits added depression of the accelerator pedal after the switch has been closed.

The switch may be grounded as at 76 and connected in parallel by a conductor 77 to the switch contacts 53, 54 and 55. The remainder of the mechanism is the same as in the arrangement shown in Fig. 1, and similar reference characters have been employed to designate the same.

Since it is necessary for both the switches 71 and 50 to be opened before the ignition will be interrupted, the arrangement shown in Fig. 2 is one in which the ignition can be interrupted only when the throttle is closed and when a shift is being made from one of the engaged to the neutral position of the clutch 26 or vice versa.

The arrangement shown in Fig. 3 is one wherein the ignition is interrupted by grounding rather than by opening the circuit. In this arrangement, the switch 50' includes the two contacts 53' and 55' which are positioned so as to be engaged when the actuator lever 35 is moving between the engaged and disengaged positions of the clutch 26'. The contacts 53' and 55' are connected to the ignition by a grounding conductor 57' which does not form a part of the normal ignition energizing circuit, the latter including the source of energy 46, and the conductor 56'. The contacts 53' and 55' are connected to the ground 58 through the lever 52. The lever 52 passes entirely across the contacts 53', 55'.

The interlock mechanism 51 and the linkage for connecting the actuator lever 35 to the clutch 26' are shown as being the same as illustrated in Fig. 1 and the same reference characters have been used to designate the parts thereof.

Fig. 3 illustrates how the invention may be applied to a planetary type of transmission including a sun gear 81 driven from the driving shaft 82, planet gears 83 mounted on a carrier 84 which has a hub 85 on which the clutch sleeve 28' is slidingly splined. The ring gear teeth 86 are carried by a drum 87 connected to the driven shaft 88 by a bearing portion 89 in which the shaft 82 is piloted by means of roller bearings 90.

Mounted in the drum 87 is a ring 91 having jaw clutch teeth 92 with which the teeth 93 of the clutch sleeve 28' are adapted to mesh when the sleeve is shifted to the right as viewed in Fig. 3. This will lock the planetary gearing to establish a direct drive from the shaft 82 to the shaft 88.

When the sleeve 28' is shifted to the left, bringing its teeth 94 into mesh with teeth 95 carried by a ring 96 mounted in the transmission housing, a reverse drive between the shafts 82 and 88 will be established through the planetary gearing.

I claim:

1. In combination with a source of rotative power, control means therefor, a load shaft, positively interengageable drive control elements for establishing a drive from said power source to said load shaft, means for shifting said drive control elements between engaged and disengaged relation and vice versa, and means, cooperating with said power control means and said shifting means, adapted, during the transition of said shifting means between a neutral and a drive establishing position, to shift said power control means to cause it to establish a coast load on said drive control elements and simultaneously to cause a fluctuation in the power output of said power source, whereby to momentarily relieve said load and correspondingly facilitate relative shifting movement of said drive control elements.

2. In combination with an internal combustion engine having a throttle for controlling the same and having an ignition, a load shaft, positively interengageable drive control elements for establishing a drive from said engine to said load shaft, means for shifting said elements from disengaged to engaged relationship and vice versa, and means adapted on movement of said shifting means to close said throttle and to interrupt and then restore said ignition and thereby to effect a fluctuation in the power output of said power source when said drive control elements are under a coast load resulting from closing movement of said throttle, whereby to momentarily relieve said coast load and correspondingly facilitate relative shifting movement of said drive control elements.

3. In combination with an internal combustion engine having a throttle for controlling the same and having an ignition, a load shaft, positively interengageable drive control elements for establishing a drive from said engine to said load shaft, means for shifting said drive control elements from disengaged to engaged relation and vice versa, and means operated by said shifting means during shifting thereof to first effect the movement of said throttle toward closed position so as to establish a coast load on said drive control elements and to then interrupt and reestablish said ignition so as to momentarily relieve said coast load and correspondingly facilitate the relative shifting of said drive control elements.

4. The combination with a source of rotative power, of a load shaft, positively interengageable individually rotatable drive control elements for establishing a drive from said power source to said load shaft, means for shifting said drive control elements from disengaged to engaged relation and vice versa, said means including an operating member for biasing the shifting means and a resilient connection adapted to be biased by said operating member to transmit the shifting movement to said drive control elements, and ignition interrupting means connected to and moving directly with said operating member and effective during a shift thereof from one to another of the positions thereof to cause a fluctuation in the power output of said power source and thereby to facilitate the relative shifting movement of said drive control elements.

5. In combination with an internal combustion engine having a throttle for controlling the same and having an ignition, a load shaft, positively interengageable drive control elements for establishing a drive from said engine to said load shaft, means for shifting said drive control elements from disengaged to engaged relation and vice versa, means adapted for interrupting said ignition and then restoring the same to facilitate relative shifting movement of said drive control elements, and means cooperating with said ignition interrupting means and said throttle to allow such ignition interruption only when said throttle is in engine idling position.

6. In combination with an internal combustion engine having a throttle for controlling the same and having an ignition, a load shaft, means including a jaw clutch for transmitting power from said engine to said load shaft, means for shifting said jaw clutch from disengaged to engaged relation and vice versa, means operable by said shifting means during shifting movement thereof for interrupting and then restoring said ignition, and means coordinating said ignition interrupting means and said throttle so that said ignition interruption may be effected only when said throttle is closed.

7. In combination with an internal combustion engine having a throttle for controlling the same and having an ignition, a load shaft, positively interengageable drive control elements for establishing a drive from said engine to said load shaft, means for shifting said drive control elements from disengaged to engaged relation and vice versa, and means, operable only when the throttle is in closed position and during a shift of said shifting means, for momentarily interrupting and then restoring said ignition so as to facilitate the relative shifting movement of said drive control elements, said ignition interrupting means including a switch controlled by said shifting means and a switch controlled in accordance with the throttle position, said switches being cooperatively effective to interrupt the ignition.

8. In combination with an internal combustion engine having a throttle for controlling the same and having an ignition, a load shaft, positively interengageable drive control elements for establishing a drive from said engine to said load shaft, means for shifting said drive control elements from disengaged to engaged relation and vice versa, means mechanically linking said shifting means and said throttle and being adapted to positively move the throttle to closed position during shifting movement of said shifting means, and means, operable only when the throttle is in closed position and during a shift of said shifting means, for momentarily interrupting and then restoring said ignition so as to facilitate the relative shifting movement of said drive control elements, said ignition interrupting means including a switch controlled by said shifting means and in turn controlling the ignition interruption.

9. The combination, with a source of rotative power, of a load shaft, control means for said power source, positively interengageable drive control elements for establishing a drive from said power source to said load shaft, said means including an operating member for biasing the shifting means and a resilient connection adapted to be biased by said operating member to transmit the shifting movement to said drive control elements, means moving directly with said operating member and effective during a shift thereof from one to another of the positions thereof to cause a fluctuation in the power output of said power source and thereby to facilitate the relative shifting movement of said drive control elements, and means interlinking said control means and said shifting means effective to positively set said control means in a position to establish a coast load on said drive control elements when said shifting means is in a position to effect said fluctuation.

10. In combination with a source of rotative power, a throttle for controlling said source of power, a load shaft, positively interengageable drive control elements for establishing a drive from said power source to said load shaft, means for shifting said drive control elements between disengaged and engaged relation and vice versa, and means cooperating with the throttle and operable only when the throttle is in closed position and during a shift of said shifting means for causing a fluctuation in the power output of said power source to facilitate relative movement of said drive control elements.

11. In combination with a source of rotative power, a throttle for controlling said source of power, a load shaft, positively interengageable drive control elements for establishing a drive from said power source to said load shaft, means for shifting said drive control elements between disengaged and engaged relation and vice versa, and means controlled by said shifting means and cooperating with said throttle and operable only when the throttle is in closed position and during a shift of said shifting means for causing a fluctuation in the power output of said power source to facilitate relative movement of said drive control elements.

12. The combination with a source of rotative power including an ignition, of control means for said power source, a load shaft, positively interengageable drive control elements for establishing a drive from said power source to said load shaft, means for shifting said drive control elements from disengaged to engaged relation and vice versa, said means including an operating member for biasing the shifting means and a resilient connection adapted to be biased by said operating member to transmit the shifting movement to said drive control elements, means moving directly with said operating member and effective during a shift thereof from one to another of the positions thereof for interrupting and then restoring said ignition to cause a fluctuation in the power output of said power source and thereby to facilitate the relative shifting movement of said drive control elements, and means interlinking said control means and said shifting means and adapted to render said ignition interrupting means effective only when said control means is in a position to establish a coast load on said drive control elements.

13. In combination with a source of rotative power, throttle control means therefor, a load shaft, positively interengageable drive control elements for establishing a drive from said power source to said load shaft, means for shifting said drive control elements between disengaged and engaged relation and vice versa, and means, including a member movable with and connecting said throttle control means and said shifting means, for causing a fluctuation in the power output of said power source and to shift said throttle control means to cause it to establish a coast load on said drive control elements to facilitate relative movement of said drive control elements.

14. In combination with a source of rotative power, throttle control means therefor, positively interengageable drive control elements for establishing a drive from said power source to said load shaft, means for shifting said drive control elements between disengaged and engaged relation and vice versa, and means connected to, movable with and controlled by said shifting means to shift said throttle control means to cause it to establish a coast load on said drive control elements and to cause a fluctuation in the power output of said power source irrespective of the speed of said drive control elements at such time whereby to momentarily relieve said load and correspondingly facilitate shifting movement of said drive control elements.

JOHN M. SIMPSON.

(References on following page)

REFERENCES CITED

The following references are of record in the file of this patent:

UNITED STATES PATENTS

| Number | Name | Date |
|---|---|---|
| 1,081,092 | Chalmers | Dec. 9, 1913 |
| 1,185,528 | Oddie | May 30, 1916 |
| 1,410,454 | Butcher | Mar. 21, 1922 |
| 1,424,790 | Wiles | Aug. 8, 1922 |
| 1,436,422 | Wiles | Nov. 21, 1922 |
| 1,599,123 | Fay | Sept. 7, 1926 |
| 1,890,790 | Messinger | Dec. 13, 1932 |
| 1,946,200 | Easter | Feb. 6, 1934 |
| 2,075,272 | Dach | Mar. 3, 1937 |
| 2,122,488 | Patterson | July 5, 1938 |
| 2,225,493 | Barnes | Dec. 17, 1940 |
| 2,264,010 | Syrovy | Nov. 25, 1941 |
| 2,267,464 | Iavelli | Dec. 23, 1941 |
| 2,392,520 | Benz | Jan. 8, 1946 |